US012804529B2

(12) United States Patent
Liu

(10) Patent No.: US 12,804,529 B2
(45) Date of Patent: Nov. 17, 2026

(54) CELL ACCESS SELECTION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 522 days.

(21) Appl. No.: 18/164,146

(22) Filed: Feb. 3, 2023

(65) Prior Publication Data

US 2023/0189135 A1 Jun. 15, 2023

Related U.S. Application Data

(63) Continuation of application No. PCT/CN2020/107226, filed on Aug. 5, 2020.

(51) Int. Cl.
*H04W 48/18* (2009.01)
*H04W 60/04* (2009.01)

(52) U.S. Cl.
CPC ........... *H04W 48/18* (2013.01); *H04W 60/04* (2013.01)

(58) Field of Classification Search
CPC ..... H04W 48/18; H04W 60/04; H04W 60/00; H04W 84/042; H04W 48/16; H04W 48/20; H04W 48/08
See application file for complete search history.

(56) References Cited

U.S. PATENT DOCUMENTS

2014/0348064 A1* 11/2014 Jeong .............. H04W 36/00224 370/328
2018/0367980 A1* 12/2018 Lee ...................... H04W 48/08
2021/0329539 A1* 10/2021 Surisetty ............... H04W 48/16
2023/0052699 A1* 2/2023 Ninglekhu ............ H04W 48/18
2023/0108950 A1* 4/2023 Centonza ............. H04W 36/14 370/331
2023/0156583 A1* 5/2023 Murray ................. H04W 48/20 370/329

(Continued)

FOREIGN PATENT DOCUMENTS

CN 108024326 A 5/2018
CN 109548099 A 3/2019
CN 109951877 A 6/2019

(Continued)

OTHER PUBLICATIONS

Convida Wireless LLC et al., "KI #7, New Sol: Providing Operating Band Information in the Configured NSSAI," SA WG2 Meeting #139e, S2-2004195, Jun. 2020.

(Continued)

*Primary Examiner* — Marcus Hammonds
(74) *Attorney, Agent, or Firm* — Hodgson Russ LLP

(57) ABSTRACT

Embodiments of the present application relate to a cell access selection method, a terminal device, and a network device. The method comprises: the terminal device receiving a target operating frequency band and/or a target tracking area identity (TAI); and performing cell selection according to the target operating frequency band and/or the target TAI.

19 Claims, 6 Drawing Sheets

(56) References Cited

U.S. PATENT DOCUMENTS

| | | | | |
|---|---|---|---|---|
| 2023/0156584 A1* | 5/2023 | Choi | ..................... | H04W 48/18 370/329 |

FOREIGN PATENT DOCUMENTS

| | | | |
|---|---|---|---|
| CN | 110366241 | A | 10/2019 |
| CN | 111052818 | A | 4/2020 |
| CN | 111148187 | A | 5/2020 |
| EP | 2744273 | A1 | 6/2014 |
| EP | 2806694 | A1 | 11/2014 |

OTHER PUBLICATIONS

"LS on architectures for access to SNPNs using credentials owned by an entity separate from the SNPN," SA WG2 Meeting #139E (e-meeting), S2-2004385, Jun. 2020.
WIPO, International Search Report and Written Opinion for PCT/CN2020/107226, Apr. 30, 2021.
"3rd Generation Partnership Project; Technical Specification Group Services and System Aspects; Study on enhancement of network slicing; Phase 2 (Release 17)," 3GPP TR 23.700-40, Mar. 2021, v17.0.0.
"3rd Generation Partnership Project; Technical Specification Group Services and System Aspects; Procedures for the 5G System (5GS); Stage 2 (Release 16)," 3GPP TS 23.502, Jul. 2020, v16.5.0.
"3rd Generation Partnership Project; Technical Specification Group Services and System Aspects; System architecture for the 5G System (5GS); Stage 2 (Release 16)," 3GPP TS 23.501, Aug. 2020, v16.5.1.
EPO, Extended European Search Report for EP Application No. 20948296.7, Sep. 5, 2023.
"5G; Non-Access Stratum (NAS) protocol for 5G System (5GS); Stage 3 (3GPP TS 24.501 version 15.6.0 Release 15)," ETSI TS 124 501, Jan. 2020, v15.6.0.
Sharp, "UE behaviour when the UE receives the rejected NSSAI for the current RA in the registration reject message and the RA is not stored," 3GPP TSG-CT WG1 Meeting #123-e, C1-202528, Apr. 2020.

* cited by examiner

CELL ACCESS SELECTION METHOD, TERMINAL DEVICE, AND NETWORK DEVICE

CROSS REFERENCE

The present application is a continuation of International Application No. PCT/CN2020/107226, filed Aug. 5, 2020, the entire disclosure of which is incorporated herein by reference.

TECHNICAL FIELD

The present application relates to the communication field, and more specifically, relates to a method for selecting an access cell, a terminal device and a network device.

BACKGROUND

In the prior art, when the UE selects a cell to access, it does not perceive which single-network slice selection assistance information (S-NSSAI) the cell supports. The UE requests the required S-NSSAI by carrying the requested NSSAI (which may contain multiple S-NSSAI) in the registration request message; if the cell supports the access of the S-NSSAI, the access and mobility management function (AMF) carries the S-NSSAI in the allowed NSSAI carried in the registration accept message to indicate that the UE is allowed to use the service of the slice. If the cell or the radio access network (RAN) node where the UE is located does not support the access of the S-NSSAI, the AMF carries the rejected S-NSSAI in the rejected NSSAI carried in the registration accept message, to indicate that the UE cannot use the services of this slice.

In addition, in R17, the 3rd Generation Partnership Project (3GPP) began to consider that cells in different frequency bands support different S-NSSAI, and the 3GPP provides two ways for the UE to select a suitable cell or frequency band according to the S-NSSAI before accessing. The first one is to increase the accessible frequency band in the configured NSSAI, so that when the UE requests the accessed S-NSSAI according to the S-NSSAI in the configured NSSAI, the configured NSSAI can be directly configured on the UE. The second one is to update in the later registration process, for example, carrying a new configured NSSAI in the registration accept message; or update the configured NSSAI during the UE configuration update process, and then the UE selects the cell for access according to the frequency band corresponding to the S-NSSAI in the configured NSSAI.

SUMMARY

The embodiment of the present application provides a method for selecting an access cell, a terminal device, and a network device.

The embodiment of this application proposes a method for selecting an access cell, including:

receiving, by a terminal device, a target operating frequency band and/or a target tracking area identifier TAI; and performing cell selection according to the target operating frequency band and/or the target TAI.

The embodiment of the present application also proposes a method for selecting an access cell, including:

sending, by a network device, target operating frequency band and/or a target TAI, wherein the target operating frequency band and/or the target TAI are used by a terminal device to perform cell selection.

The embodiment of this application also proposes a configuration method, including:

sending configuration information to an AMF, wherein the configuration information includes an operating frequency band and/or a TAI information supported by an S-NSSAI.

The embodiment of the present application also proposes a message sending method, including:

sending, by a RAN node, a message to an AMF, wherein the message includes an S-NSSAI corresponding to a frequency band supported by the RAN node, and/or an S-NSSAI corresponding to a TAI supported by the RAN node.

The embodiment of the present application also proposes a terminal device, including: a processor and a memory, the memory is used to store a computer program, the processor is used to call and run the computer program stored in the memory, and execute any one of the above methods.

The embodiment of the present application also proposes a network device, including: a processor and a memory, the memory is used to store a computer program, the processor is used to call and run the computer program stored in the memory, and execute any one of the above methods.

The embodiment of the present application also proposes a chip, including: a processor, configured to call and run a computer program from a memory, so that a device installed with the chip executes any one of the above methods.

The embodiment of the present application also proposes a chip, including: a processor, configured to call and run a computer program from a memory, so that a device installed with the chip executes any one of the above methods.

The embodiment of the present application also provides a computer-readable storage medium for storing a computer program, and the computer program causes a computer to execute any one of the above methods.

The embodiment of the present application also provides a computer-readable storage medium for storing a computer program, and the computer program causes a computer to execute any one of the above methods.

The embodiment of the present application also provides a computer program product, including computer program instructions, where the computer program instructions cause a computer to execute any one of the above methods.

The embodiment of the present application also provides a computer program product, including computer program instructions, where the computer program instructions cause a computer to execute any one of the above methods.

The embodiment of the present application also provides a computer program, the computer program causes a computer to execute any one of the above methods.

The embodiment of the present application also provides a computer program, the computer program causes a computer to execute any one of the above methods.

DETAILED DESCRIPTION

Figure 1:
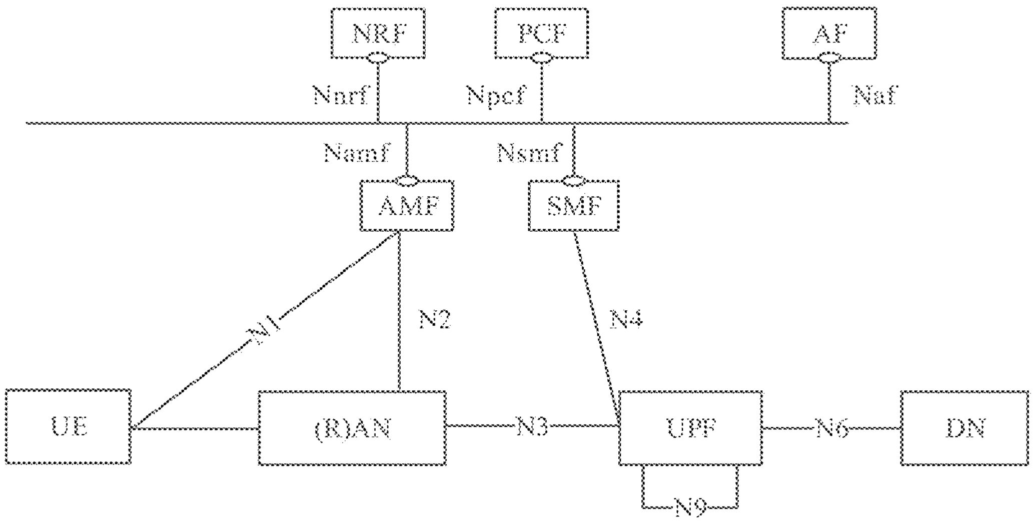
FIG. 1 is a schematic diagram of an application scenario of an embodiment of the present application.

Hereinafter, the technical solutions in the embodiments of the present application will be described with reference to the drawings in the embodiments of the present application.

It should be noted that the terms "first" and "second" in the description and claims of the embodiments of the present application and the above drawings are used to distinguish similar objects, and not necessarily used to describe a specific order or sequence order. The objects described by "first" and "second" described at the same time may be the same or different.

The technical solutions of the embodiments of the present application can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system , New Radio (NR) system, evolution system of NR system, LTE-based access to unlicensed spectrum (LTE-U) system, NR-based access to unlicensed spectrum (NR-U) system, Universal Mobile Telecommunications System (UMTS), Wireless Local Area Networks (WLAN), Wireless Fidelity (WiFi), next-generation communication (5th-Generation, 5G) system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), and Vehicle to Vehicle (V2V) communication, etc., the embodiments of the present application may also be applied to these communication systems.

Optionally, the communication system in this embodiment of the application can be applied to a carrier aggregation (CA) scenario, a dual connectivity (DC) scenario, or a standalone (SA) networking scene.

The embodiment of the present application does not limit the applied frequency spectrum. For example, the embodiments of the present application may be applied to licensed spectrum, and may also be applied to unlicensed spectrum.

The embodiments of the present application describe various embodiments in conjunction with network device and terminal device, wherein the terminal device may also be referred to as user equipment (UE), access terminal, user unit, user station, mobile station, mobile site, remote station, remote terminal, mobile device, user terminal, terminal, wireless communication device, user agent or user device, etc.

A terminal device can be a station (STAION, ST) in a WLAN, a cellular phone, a cordless phone, a Session Initiation Protocol (SIP) phone, a Wireless Local Loop (WLL) station, a personal digital assistant (PDA) devices, bandheld devices with wireless communication functions, computing devices or other processing devices connected to wireless modems, vehicle-mounted devices, wearable devices, terminal device in the next-generation communication systems such as NR networks, or terminal device in future evolved public land mobile network (PLMN) network, etc.

As an example but not a limitation, in this embodiment of the present application, the terminal device may also be a wearable device. Wearable devices can also be called wearable smart devices, which is a general term for the application of wearable technology to intelligently design daily wear and develop wearable devices, such as glasses, gloves, watches, clothing and shoes. A wearable device is a portable device that is worn directly on the body or integrated into the user's clothing or accessories. Wearable devices are not only a hardware device, but also achieve powerful functions through software support, data interaction, and cloud interaction. Generalized wearable smart devices include those of full-featured, large-sized, complete or partial functions without relying on smart phones, such as smart watches or smart glasses, etc., and those only focus on a certain type of application functions, and need to cooperate with other devices such as smart phones, such as various smart bracelets and smart jewelry for physical sign monitoring.

The network device may be a device used to communicate with mobile devices, and the network device may be an access point (AP) in WLAN, a base transceiver station (BTS) in GSM or CDMA, or a base station (NodeB, NB) in WCDMA, or an evolved base station (Evolutional Node B, eNB or eNodeB) in LTE, or a relay station or an access point, or a vehicle-mounted device, a wearable device, and a network device (gNB) in an NR network, or the network device in the future evolution of the PLMN network, etc.

In this embodiment of the application, the network device provides services for a cell, and the terminal device communicates with the network device through the transmission resources (for example, frequency domain resources, or spectrum resources) used by the cell. The cell may be a cell corresponding to a network device (e.g., a base station), the cell may belong to a macro base station, or a base station corresponding to a small cell, wherein the small cell may include: Metro cell, Micro cell, Pico cell, Femto cell, etc. These small cells have the characteristics of small coverage and low transmission power, and are suitable for providing high-speed data transmission services.

FIG. 1 exemplarily shows a system architecture diagram of a mobile terminal accessing a mobile network. The mobile terminal connects with the base station at the access stratum (AS), and exchanges access stratum messages and wireless data transmission; the UE and the mobile management function perform non-access stratum (NAS) connection and interactives the NAS information. The access and mobility management function is used for the management of UE mobility, and the session management function is used for the session management of the UE. In addition to performing mobility management on the mobile terminal, the access and mobility management function is also used for forwarding information related to session management between the mobile terminal and the session management function. The policy control function is used for formulating policies related to UE mobility management, session management, and charging. The user plane function is connected to the base station and external data network for data transmission.

It should be understood that the terms "system" and "network" are often used interchangeably herein. The term "and/or" in this disclosure is just an association relationship describing associated objects, which means that there can be three relationships, for example, A and/or B can mean: A exists alone, A and B exist simultaneously, and B exists alone. In addition, the character "/" in this disclosure generally indicates that the associated objects before and after are in an "or" relationship.

Figure 2:
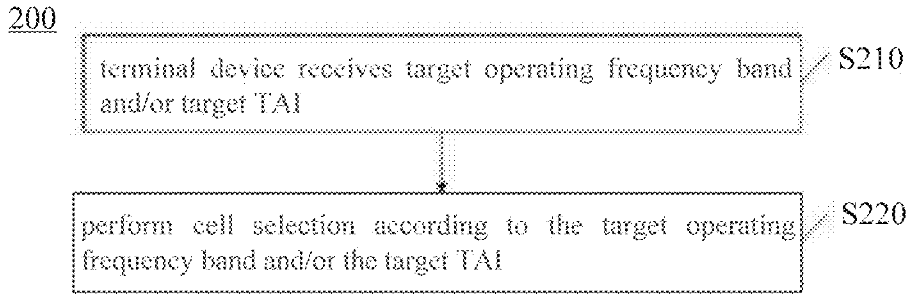
FIG. 2 is a flow chart of implementing a method 200 for selecting an access cell according to an embodiment of the present application.

The embodiment of this application proposes a method for selecting an access cell. FIG. 2 is a flow chart of a method 200 for selecting an access cell according to an embodiment of the application. This method can optionally be applied to the system shown in FIG. 1. but not limited to this. The method includes at least some of the following.

S210: the terminal device receives the target operating frequency band and/or target tracking area identity (TAI); and S220: perform cell selection according to the target operating frequency band and/or the target TAI.

Optionally, the terminal device may receive the target operating frequency band and/or the target TAI sent by the AMF.

When the UE initiates a registration request (the registration request message carries the S-NSSAI that the UE wants to access), if the current RAN frequency band or the TAI it is in does not support the S-NSSAI requested by the UE, the AMF can send the target operating band and/or target TAI of the rejected S-NSSAI. When the UE wants to re-access the rejected S-NSSAI, it can select a cell according to the above target operating frequency band and/or target TAI, and then initiate the registration process again.

Figure 3:
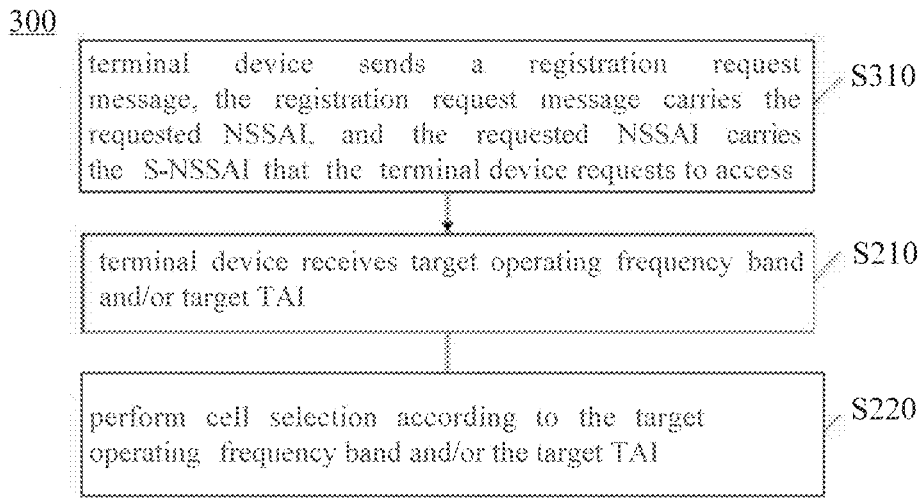
FIG. 3 is a flow chart of implementing a method 300 for selecting an access cell according to an embodiment of the present application.

Optionally, as shown in FIG. 3, before the above step S210, it may include:

S310: The terminal device sends a registration request message, the registration request message carries the requested NSSAI, and the requested NSSAI carries the S-NSSAI that the terminal device requests to access.

Optionally, the above step S220 specifically includes:

the terminal device releases the NAS connection;

performing cell selection according to the target operating frequency band and/or the target TAI; and sending a registration request.

Hereinafter, referring to the accompanying drawings, the present application will be described in detail with reference to specific embodiments.

Embodiment One

Figure 4:
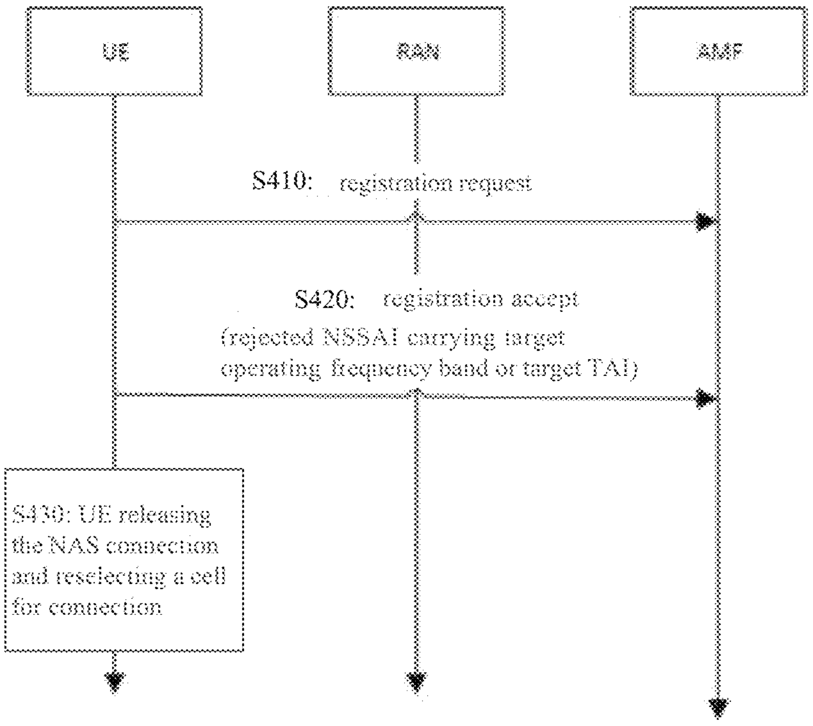
FIG. 4 is an implementation flowchart of Embodiment 1 of the present application.

FIG. 4 is an implementation flowchart of Embodiment one of the present application. With reference to FIG. 4, present embodiment includes the following steps:

S410: The UE initiates registration with the AMF, such as sending a registration request message, the registration request message carries a requested NSSAI, and the requested NSSAI carries S-NSSAI information that the UE wants to access.

S420: Because the current RAN frequency band or the TAI where it is located does not support the requested S-NSSAI, the AMF carries the rejected NSSAI (Rejected NSSAI) in the registration accept message, and the Rejected NSSAI carries the target operating frequency band and/or target TAI corresponding to the Rejected S-NSSAI.

Optionally, the above mentioned Rejected NSSAI may include a rejection cause value.

Optionally, the above Rejected NSSAI may include indication information allowing the terminal device to support the target operating frequency band and/or the target TAI, to notify the UE of the frequency band or TAI that can support the rejected S-NSSAI.

It should be noted that the AMF may learn the frequency band or TAI supported by the S-NSSAI through configuration. For example, an operation and maintenance (Operation and Maintenance, O&M) system sends configuration information to the AMF, where the configuration information includes frequency bands or TAIs supported by the S-NSSAI.

Alternatively, the RAN may send the frequency band supported by the RAN and the corresponding S-NSSAI, and/or the TAI supported by the RAN and the corresponding S-NSSAI to the AMF. The RAN may notify AMF through the N2 message.

The registration accept message is an integrity protected message.

S430: When the UE wishes to access the rejected S-NSSAI again, the UE may release the non-access stratum (NAS) connection, and select a cell according to the target frequency band information or target TAI information in step S420. and then initiate the registration process again.

Embodiment Two

Figure 5:
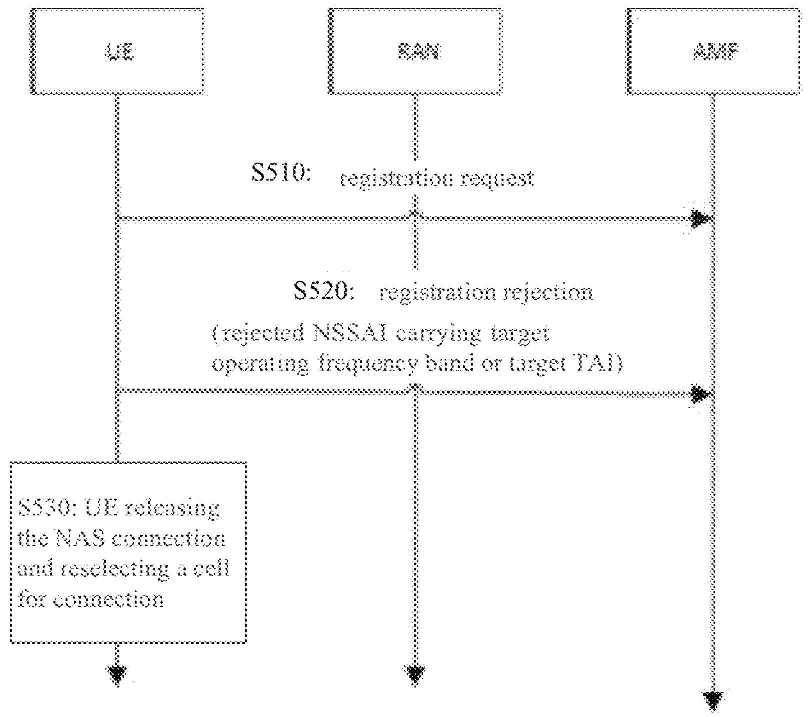
FIG. 5 is an implementation flow chart of Embodiment 2 of the present application.

FIG. 5 is an implementation flow chart of Embodiment two of the present application. Referring to FIG. 5. this embodiment includes the following steps:

S510: The UE initiates registration with the AMF, such as sending a registration request message, the registration request message carries a requested NSSAI (Requested NSSAI), and the Requested NSSAI carries S-NSSAI information that the UE wants to access.

S520: Because the current RAN frequency band or the TAI where it is located does not support the requested S-NSSAI, the AMF carries the rejected NSSAI (Rejected NSSAI) in the registration rejection message, and the Rejected NSSAI carries the target operating frequency band and/or the target TAI corresponding to the rejected S-NSSAI.

Optionally, the above mentioned Rejected NSSAI may include a rejection cause value.

Optionally, the above Rejected NSSAI may include indication information allowing the terminal device to support the target operating frequency band and/or the target TAI, which is used to notify the UE of the frequency band or TAI that can support the rejected S-NSSAI.

The manner in which the AMF learns the frequency band or TAI supported by the S-NSSAI is the same as drat in Embodiment one, and will not be repeated here.

It should be noted that the registration rejection message is an integrity protected message. If the message is not integrity protected, the UE will consider that the message is sent by a false base station.

S530: When the UE wants to access the rejected S-NSSAI again, the UE can release the NAS connection, select a cell according to the target frequency band information or target TAI information in step S520, and then initiate the registration process again.

Embodiment Three

Figure 6:
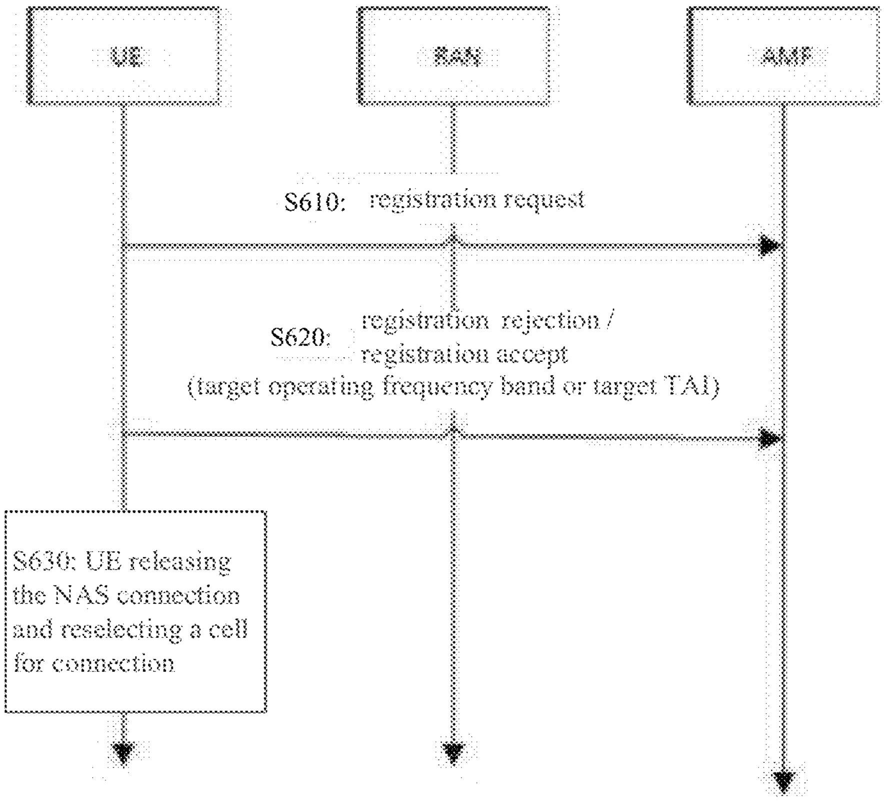
FIG. 6 is an implementation flowchart of Embodiment 3 of the present application.

FIG. 6 is an implementation flowchart of Embodiment three of the present application. Referring to FIG. 6, the present embodiment includes the following steps:

S610: The UE initiates registration with the AMF, such as sending a registration request message, the registration request message carries a requested NSSAI (Requested NSSAI), and the Requested NSSAI carries S-NSSAI information that the UE wants to access.

S620: Because the current RAN frequency band or the TAI where it is located does not support the requested S-NSSAI, the AMF carries the target operating frequency band and/or the target TAI in the registration rejection message or the registration accept message, to notify the UE of the frequency band or TAI that can support the rejected S-NSSAI.

The manner in which the AMF learns the frequency band or TAI supported by the S-NSSAI is the same as that in Embodiment one, and will not be repeated here.

It should be noted that the registration accept message or registration rejection message is an integrity protected message. If integrity protection is not performed on the registration rejection message, the UE will consider that the message is sent by a false base station.

S630: When the UE wants to access the rejected S-NSSAI again, the UE can release the NAS connection, select a cell according to the target frequency band information or target TAI information in step S620, and then initiate the registration process again.

To sum up, in the embodiment of the present application, the UE receives the target operating frequency band and/or target TAI, and performs cell selection according to the target operating frequency band and/or target TAI, so that there is no need to configure the frequency band information corresponding to the slice for the UE, which can avoid the case where the cell selected by the UE does not support the slice that the UE wants to access.

The embodiment of this application is still applicable to the newly upgraded network.

In addition, in the prior art, the UE selects a cell to access according to the frequency band information carried in the RRC release message, and the RAN needs to perform the integrity protection on the RRC release message sent to the UE; and if the RAN does not have the corresponding security context, the integrity protection of RRC release messages is not possible. In the embodiment of the present application, the AMF sends the target operating frequency band and/or the target TAI to the UE. The AMF itself has integrity protection capabilities, so the embodiment of the present application solves the problem in the prior art that the integrity protection may not be performed on the message carrying the frequency band information. It can be seen that the embodiment of the present application is suitable for the scenario where the RAN cannot obtain the security context.

Figure 7:
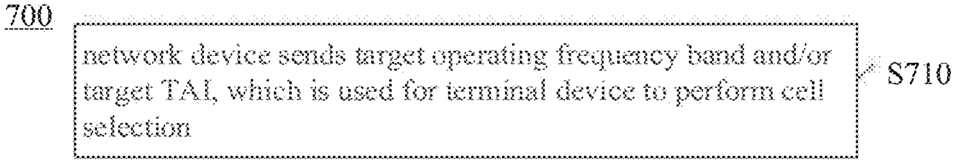
FIG. 7 is a flow chart of implementing a method 700 for selecting an access cell according to an embodiment of the present application.

The embodiment of the present application also proposes a method for selecting an access cell. FIG. 7 is an implementation flowchart of a method 700 for selecting an access cell according to the embodiment of the present application, which includes the following.

S710: The network device sends the target operating frequency band and/or the target TAI, wherein the target operating frequency band and/or the target TAI are used for the terminal device to perform cell selection.

Optionally, the network device includes an AMF.

Optionally, the network device sends a registration accept message, wherein the registration accept message carries a rejected NSSAI, and the rejected NSSAI carries a target operating frequency band and/or a target TAI corresponding to the S-NSSAI.

Optionally, the network device sends a registration rejection message, wherein the registration rejection message carries a rejected NSSAI, and the rejected NSSAI carries a target operating frequency band and/or a target TAI corresponding to the S-NSSAI.

Optionally, the rejected NSSAI includes a rejection cause value.

Optionally, the rejected NSSAI includes indication information allowing the terminal device to support the target operating frequency band and/or the target TAI.

Optionally, the network device sends a registration accept message or a registration rejection message, wherein the registration accept message or registration rejection message carries the target operating frequency band and/or the target TAI.

Optionally, the network device performs integrity protection on the registration rejection message.

Optionally, before the above sending, the method further includes: receiving a registration request message, wherein the registration request message carries the requested NSSAI, and the requested NSSAI carries the S-NSSAI that the terminal device requests to access. The registration request message may be sent by the UE to the AMF.

Optionally, before the above sending, the method may further include: receiving configuration information, wherein the configuration information includes the operating frequency bands and/or the TAI information supported by the S-NSSAI. The configuration information can be sent to the AMF by the operation and maintenance system.

Optionally, before the above sending, the method may further include: receiving a message sent by the RAN node, the message including the frequency band supported by the RAN node and the corresponding S-NSSAI, and/or the TAI supported by the RAN node and the corresponding S-NSSAI.

Figure 8:
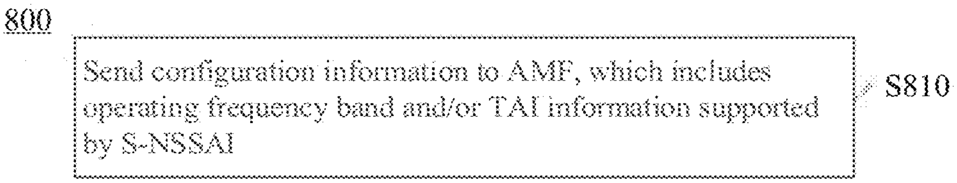
FIG. 8 is an implementation flow chart of a configuration method 800 according to an embodiment of the present application.

The embodiment of the present application also proposes a configuration method, which can be applied to the operation and maintenance system, and the system configures the operating frequency band and/or the TAI information supported by the S-NSSAI for the AMF. FIG. 8 is an implementation flowchart of the configuration method 800 according to an embodiment of the present application, which includes the following.

S810: Send configuration information to the AMF, wherein the configuration information includes the operating frequency band and/or the TAI information supported by the S-NSSAI.

Figure 9:
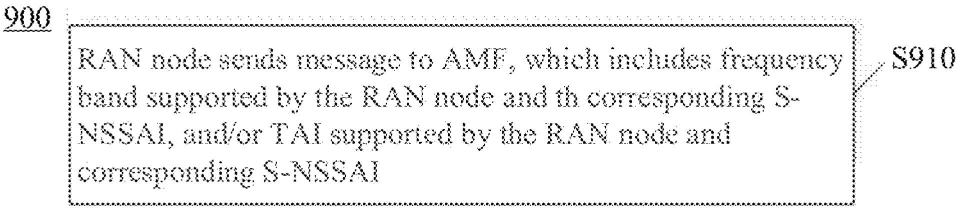
FIG. 9 is an implementation flowchart of a method 900 for sending a message according to an embodiment of the present application.

The embodiment of the present application also proposes a message sending method, which can be applied to the RAN node, and is used to provide the AMF with its supported frequency band and the corresponding S-NSSAI, and/or the supported TAI and the corresponding S-NSSAI. FIG. 9 is an implementation flowchart of the message sending method 900 according to an embodiment of the present application, which includes the following.

S910: The RAN node sends a message to the AMF; the message including the frequency band supported by the RAN node and the corresponding S-NSSAI, and/or the TAI supported by the RAN node and the corresponding S-NSSAI.

Figure 10:
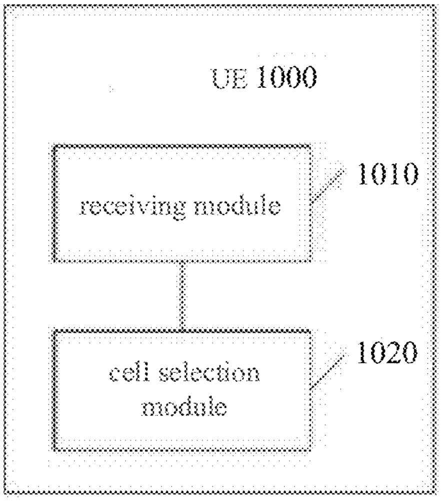
FIG. 10 is a schematic structural diagram of a terminal device 1000 according to an embodiment of the present application.

The embodiment of the present application also proposes a terminal device. FIG. 10 is a schematic structural diagram of a terminal device 1000 according to the embodiment of the present application, including:

a receiving module 1010, configured to receive a target operating frequency band and/or a target tracking area identifier TAI; and a cell selection module 1020, configured to perform cell selection according to the target operating frequency band and/or the target TAI.

Optionally, the receiving module 1010 receives the target operating frequency band and/or the target TAI sent by the AMF.

Optionally, the receiving module 1010 is used for:

receiving a registration accept message, the registration accept message carrying rejected network slice selection auxiliary information (NSSAI), and the rejected NSSAI carrying the target operating frequency band and/or the target TAI corresponding to single network slice selection auxiliary information (S-NSSAI).

Optionally, the receiving module 1010 is used for:

receiving a registration rejection message, the registration rejection message carrying rejected NSSAI, and the rejected NSSAI carrying the target operating frequency band and/or the target TAI corresponding to S-NSSAI.

Optionally, the rejected NSSAI includes a rejection cause value.

Optionally, the rejected NSSAI includes indication information allowing the terminal device to support the target operating frequency band and/or the target TAI.

Optionally, the receiving module 1010 is used for:

receiving a registration accept message or a registration rejection message, wherein the target operating frequency band and/or the target TAI are carried in the registration accept message or the registration rejection message.

Optionally, the registration rejection message is an integrity-protected message.

Figure 11:
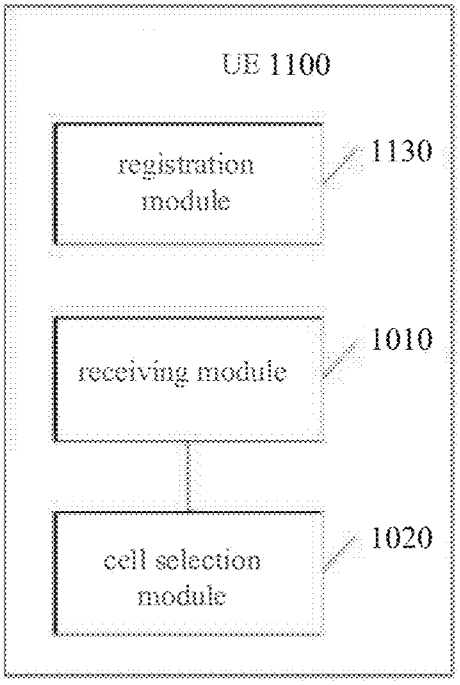
FIG. 11 is a schematic structural diagram of a terminal device 1100 according to an embodiment of the present application.

Optionally, as shown in FIG. 11, the terminal device further includes:

a registration module 1130, configured to send a registration request message, the registration request message carries the requested NSSAI, and the requested NSSAI carries the S-NSSAI that the terminal device requests to access.

Optionally, the cell selection module 1020 is configured to release the NAS connection; perform cell selection according to the target operating frequency band and/or the target TAI; and send a registration request.

Figure 12:
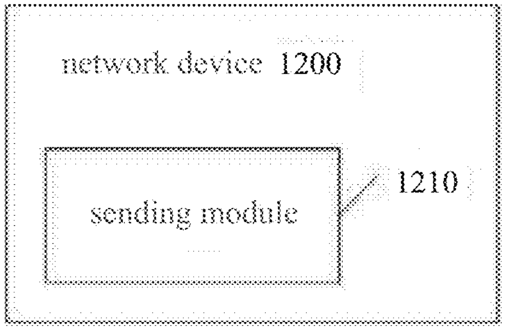
FIG. 12 is a schematic structural diagram of a network device 1200 according to an embodiment of the present application.

It should be understood that the above-mentioned and other operations and/or functions of the modules in the terminal device according to the embodiment of the present application are to realize the corresponding processes of the terminal devices in the method 200 in FIG. 2 and the method 300 in FIG. 3. respectively, which will not be repeated here, The embodiment of the present application also proposes a network device. FIG. 12 is a schematic structural diagram of a network device 1200 according to the embodiment of the present application, including:

a sending module 1210, configured to send a target operating frequency band and/or a target TAI, where the target operating frequency band and/or the target TAI are used for a terminal device to perform cell selection.

Optionally, the network device includes an AMF.

Optionally, the sending module 1210 is configured to send a registration accept message, the registration accept message carries a rejected NSSAI, and the rejected NSSAI carries the target operating frequency band and/or the target TAI corresponding to the S-NSSAI.

Optionally, the sending module 1210 is configured to send a registration rejection message, where the registration rejection message carries a rejected NSSAI, and the rejected NSSAI carries the target operating frequency band and/or the target TAI corresponding to the S-NSSAI.

Optionally, the rejected NSSAI includes a rejection cause value.

Optionally, the rejected NSSAI includes indication information allowing the terminal device to support the target operating frequency band and/or the target TAI.

Optionally, the sending module 1210 is configured to send a registration accept message or a registration rejection message, wherein the registration accept message or registration rejection message carries the target operating frequency band and/or the target TAI.

Optionally, the foregoing registration rejection message is an integrity-protected message.

Figure 13:
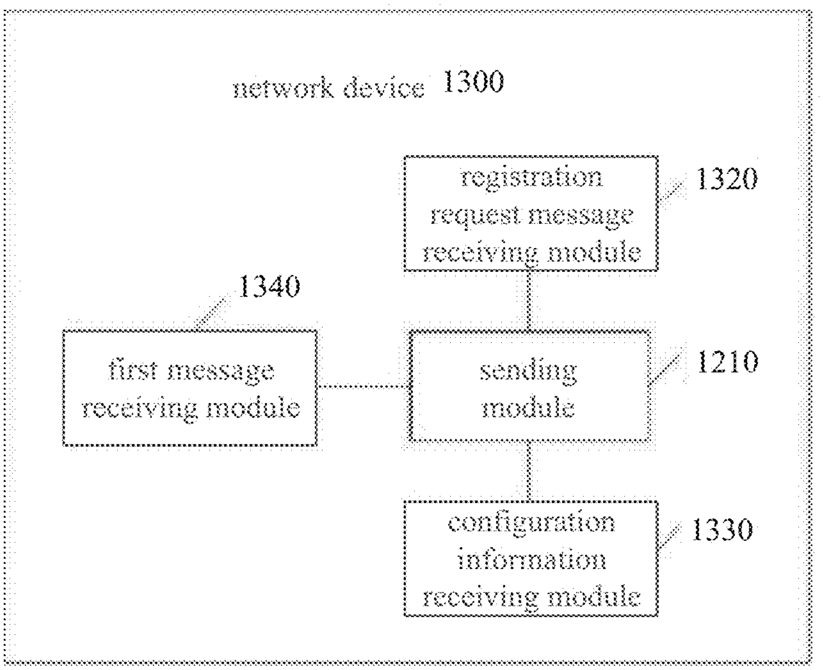
FIG. 13 is a schematic structural diagram of a network device 1300 according to an embodiment of the present application.

Optionally, as shown in FIG. 13, the network device further includes:

a registration request message receiving module 1320, configured to receive a registration request message, the registration request message carries the requested NSSAI, and the requested NSSAI carries the S-NSSAI that the terminal device requests to access.

Optionally, as shown in FIG. 13, the network device further includes:

a configuration information receiving module 1330, configured to receive configuration information, wherein the configuration information includes operating frequency bands and/or TAI information supported by the S-NSSAI.

Optionally, as shown in FIG. 13, the network device further includes:

a first message receiving module 1340, configured to receive a message sent by the RAN node; the message includes the frequency band supported by the RAN node and the corresponding S-NSSAI, and/or the TAI supported by the RAN node and the corresponding S-NSSAI.

It should be understood that the above-mentioned and other operations and/or functions of the modules in the network device according to the embodiment of the present application are respectively intended to implement a corresponding process of the network device in the method 700 in FIG. 7. For the sake of brevity, details are not repeated here.

Figure 14:
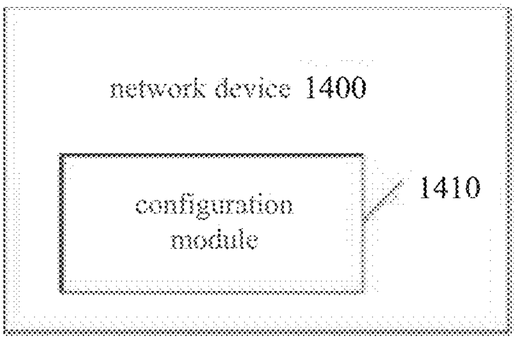
FIG. 14 is a schematic structural diagram of a network device 1400 according to an embodiment of the present application.

The embodiment of the present application also proposes a network device. FIG. 14 is a schematic structural diagram of a network device 1400 according to the embodiment of the present application, including:

a configuration module 1410, configured to send configuration information to the AMF, where the configuration information includes the operating frequency bands and/or the TAI information supported by the S-NSSAI.

It should be understood that the above-mentioned and other operations and/or functions of the modules in the network device according to the embodiment of the present application are respectively intended to implement a corresponding process of the network device in the method 800 in FIG. 8, For the sake of brevity, details are not repeated here.

Figure 15:
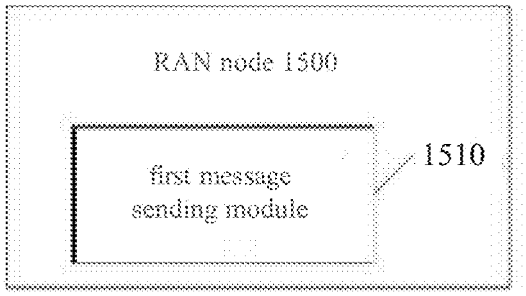
FIG. 15 is a schematic structural diagram of a RAN node 1500 according to an embodiment of the present application.

The embodiment of the present application also proposes a RAN node. FIG. 15 is a schematic structural diagram of a RAN node 1500 according to the embodiment of the present application, including:

a first message sending module 1510, configured to send a message to the AMF; the message includes the frequency band supported by the RAN node and the corresponding S-NSSAI, and/or the TAI supported by the RAN node and the corresponding S-NSSAI.

It should be understood that the above and other operations and/or functions of the modules in the RAN node according to the embodiment of the present application are respectively intended to implement the corresponding process of the RAN node in the method 900 in FIG. 9. For the sake of brevity, details are not repeated here.

Figure 16:
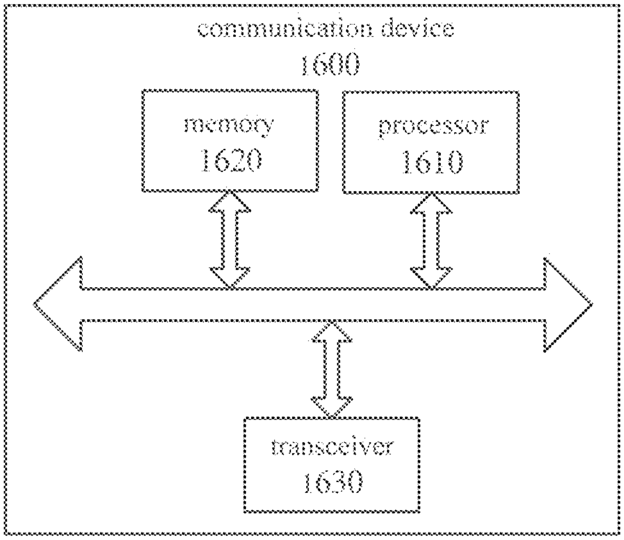
FIG. 16 is a schematic structural diagram of a communication device 1600 according to an embodiment of the present application.

FIG. 16 is a schematic structural diagram of a communication device 1600 according to an embodiment of the present application. The communication device 1600 shown in FIG. 16 includes a processor 1610, and the processor 1610 can invoke and run a computer program from a memory, to implement the method in the embodiment of the present application.

Optionally, as shown in FIG. 16, the communication device 1600 may further include a memory 1620. The processor 1610 may call and run a computer program from the memory 1620, to implement the method in the embodiment of the present application.

The memory 1620 may be an independent device independent of the processor 1610, or may be integrated in the processor 1610.

Optionally, as shown in FIG. 16, the communication device 1600 may further include a transceiver 1630, and the processor 1610 may control the transceiver 1630 to communicate with other devices, specifically, to send information or data to other devices, or receive information or data sent by other devices.

The transceiver 1630 may include a transmitter and a receiver. The transceiver 1630 may further include an antenna(s), and the number of the antenna may be one or more.

Optionally, the communication device 1600 may be the first terminal device of the embodiment of the present application, and the communication device 1600 may implement the corresponding processes implemented by the first terminal device in the methods of the embodiment of the present application. For the sake of brevity, it will not be repeated herein.

Optionally, the communication device 1600 may be the communication device such as the network device or the second terminal device, and the communication device 1600 may implement the corresponding processes implemented by the method provided by communication device in the embodiments of the present application. For the sake of brevity, it will not be repeated herein.

Figure 17:
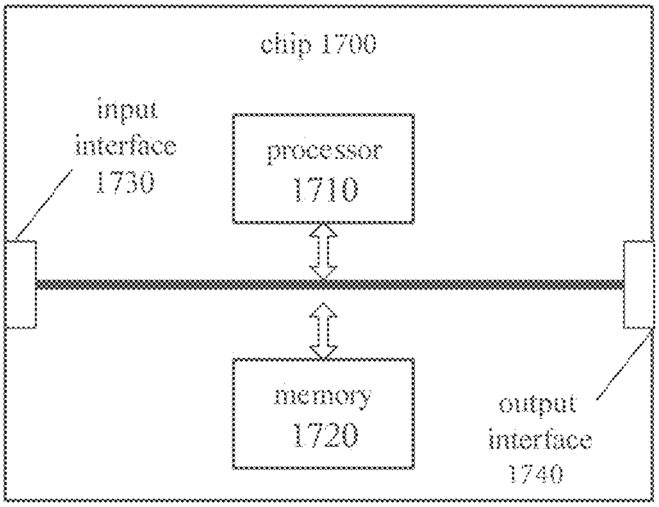
FIG. 17 is a schematic structural diagram of a chip 1700 according to an embodiment of the present application.

FIG. 17 is a schematic structural diagram of a chip 1700 according to an embodiment of the present application. The chip 1700 shown in FIG. 17 includes a processor 1710, and the processor 1710 can invoke and run a computer program from a memory, so as to implement the method in the embodiment of the present application.

Optionally, as shown in FIG. 17, the chip 1700 may further include a memory 1720. The processor 1710 may invoke and run a computer program from the memory 1720, so as to implement the method in the embodiment of the present application.

The memory 1720 may be an independent device independent of the processor 1710, or may be integrated in the processor 1710.

Optionally, the chip 1700 may also include an input interface 1730. The processor 1710 can control the input interface 1730 to communicate with other devices or chips, specifically, can obtain information or data sent by other devices or chips.

Optionally, the chip 1700 may also include an output interface 1740. The processor 1710 can control the output interface 1740 to communicate with other devices or chips, specifically, can output information or data to other devices or chips.

Optionally, the chip can be applied to the terminal device in the embodiments of the present application, and the chip can implement the corresponding processes implemented by the terminal device in the methods of the embodiments of the present application. For the sake of brevity, it will not be repeated herein.

It should be understood that the chip mentioned in the embodiment of the present application may also be referred to as a system level chip, a system chip, a chip system or a system-on-chip.

The processor mentioned above can be a general-purpose processor, a digital signal processor (DSP), a field programmable gate array (FPGA), an application specific integrated circuit (ASIC) or other programmable logic devices, transistor logic devices, discrete hardware components, etc. Wherein, the general-purpose processor mentioned above may be a. microprocessor or any conventional processor or the like.

The aforementioned memories may be volatile memories or nonvolatile memories, or may include both volatile and nonvolatile memories. The non-volatile memory can be read-only memory (ROM), programmable read-only memory (programmable ROM, PROM), erasable programmable read-only memory (erasable PROM, EPROM), electrically erasable programmable read-only memory (electrically EPROM, EEPROM) or flash memory. The volatile memory may be random access memory (RAM).

It should be understood that the above-mentioned memory is illustrative but not restrictive. For example, the memory in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM) and direct rambus random access memory (Direct Rambus RAM, DR RAM) and so on. That is, the memory in the embodiments of the present application is intended to include, but not be limited to, these and any other suitable types of memory.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present application will be implemented in whole or in part. The computer can be a general-purpose computer, a special purpose computer, a computer network, or other programmable device. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a DVD), or a semiconductor medium (such as a solid state disk (SSD)), etc.

It should be understood that, in various embodiments of the present application, the sequence numbers of the above-mentioned processes do not mean the order of execution, and the execution order of the processes should be determined by their functions and internal logic, and should not be used in the embodiments of the present application. The implementation process constitutes any limitation.

Those skilled in the art can clearly understand that for the convenience and brevity of the description, the specific operating process of the above-described system, device and unit can refer to the corresponding process in the foregoing method embodiment, which will not be repeated here.

The above is only the specific implementation of the application, but the scope of protection of the application is not limited thereto. Anyone familiar with the technical field can easily think of changes or substitutions within the technical scope disclosed in the application, which should be covered within the scope of protection of this application. Therefore, the protection scope of the present application should be based on the protection scope of the claims.

What is claimed is:

1. A method for selecting an access cell, comprising:
receiving, by a terminal device, a target tracking area identifier (TAI); and
performing cell selection according to the target TAI,
wherein receiving the target TAI comprises:
receiving a registration accept message from an access and mobility management function (AMF), the registration accept message carrying rejected network slice selection auxiliary information (NSSAI), or receiving a registration rejection message from an access and mobility management function (AMF), the registration rejection message carrying rejected NSSAI, and the rejected NSSAI comprises indication information allowing the terminal device to support the target TAI, and
wherein performing cell selection according to the target TAI comprises:
releasing a NAS connection;
performing cell selection according to the target TAI; and
sending a registration request message to the AMF,
wherein the rejected NSSAI is further configured to carry the target TAI corresponding to single network slice selection auxiliary information (S-NSSAI).

2. The method according to claim 1, wherein the rejected NSSAI comprises a rejection cause value or indication information allowing the terminal device to support the target TAI.

3. The method according to claim 1, wherein the registration rejection message is an integrity protected message.

4. The method according to claim 1, wherein the target TAI corresponds to a rejected S-NSSAI that is not supported by a TAI in which the terminal device is located.

5. The method according to claim 1, wherein the target TAI indicates a TAI that supports the rejected S-NSSAI.

6. The method according to claim 1, wherein the terminal device performs the cell selection according to the target TAI when the terminal device attempts to access the rejected S-NSSAI again.

7. A terminal device comprising: a processor and a memory, the memory is used to store a computer program, the processor is used to invoke and run the computer program stored in the memory to cause the terminal device to:
receive a target tracking area identifier (TAI); and
perform cell selection according to the target TAI,
wherein the terminal device is further caused to:
receive a registration accept message from an access and mobility management function (AMF), the registration accept message carrying rejected network slice selection auxiliary information (NSSAI), or receive a registration rejection message from an access and mobility management function (AMF), the registration rejection message carrying rejected NSSAI, and the rejected NSSAI comprises indication information allowing the terminal device to support the target TAI, and
wherein the terminal device is further caused to:
release a NAS connection;
perform cell selection according to the target TAI; and
send a registration request message to the AMF,
wherein the rejected NSSAI is further configured to carry the target TAI corresponding to single network slice selection auxiliary information (S-NSSAI).

8. The terminal device according to claim 7, wherein the rejected NSSAI comprises a rejection cause value.

9. The terminal device according to claim 7, wherein the registration rejection message is an integrity protected message.

10. The terminal device according to claim 7, wherein the target TAI corresponds to a rejected S-NSSAI that is not supported by a TAI in which the terminal device is located.

11. The terminal device according to claim 7, wherein the target TAI indicates a TAI that supports the rejected S-NSSAI.

12. The terminal device according to claim 7, wherein the terminal device is further caused to perform the cell selection according to the target TAI when the terminal device attempts to access the rejected S-NSSAI again.

13. A network device comprising:
a processor and a memory, the memory storing a computer program, the processor configured to execute the computer program to cause the network device to:
send a target TAI, wherein the target TAI is used by a terminal device to perform cell selection, wherein the network device comprises an AMF, and wherein the network device is further caused to:

send a registration accept message, the registration accept message carrying rejected network slice selection auxiliary information (NSSAI), or send a registration rejection message, the registration rejection message carrying rejected NSSAI, and the rejected NSSAI comprises indication information allowing the terminal device to support the target TAI, wherein the rejected NSSAI is further configured to carry the target TAI corresponding to single network slice selection auxiliary information (S-NSSAI).

14. The network device according to claim 13, wherein the rejected NSSAI comprises a rejection cause value.

15. The network device according to claim 13, wherein the registration rejection message is an integrity protected message.

16. The network device according to claim 13, wherein the network device is further caused to:

receive configuration information, wherein the configuration information comprises TAI information supported by S-NSSAI.

17. The network device according to claim 16, wherein the configuration information is received from an operation and maintenance system.

18. The network device according to claim 13, wherein the network device is further caused to send the target TAI when a TAI in which the terminal device is located does not support an S-NSSAI requested by the terminal device.

19. The network device according to claim 13, wherein the network device is further caused to receive, from a RAN node through an N2 message, information indicating a TAI supported by the RAN node and a corresponding S-NSSAI.

* * * * *